United States Patent
Letz et al.

(10) Patent No.: US 11,030,161 B2
(45) Date of Patent: Jun. 8, 2021

(54) BLOCKCHAIN SCALING METHOD AND BLOCKCHAIN SCALING APPARATUS

(71) Applicant: Exosite LLC, Minneapolis, MN (US)

(72) Inventors: Dominic Immanuel Letz, Taipei (TW); Samuel Stuart Webster, Anacortes, WA (US); Hans Aaron Rempel, Dillard, OR (US)

(73) Assignee: EXOSITE LLC, Minneapolis, MN (US)

(*) Notice: Subject to any disclaimer, the term of this patent is extended or adjusted under 35 U.S.C. 154(b) by 203 days.

(21) Appl. No.: 16/357,568

(22) Filed: Mar. 19, 2019

(65) Prior Publication Data

US 2019/0303353 A1 Oct. 3, 2019

Related U.S. Application Data

(60) Provisional application No. 62/648,943, filed on Mar. 28, 2018.

(51) Int. Cl.
*G06F 16/00* (2019.01)
*G06F 16/182* (2019.01)
*H04L 9/06* (2006.01)

(52) U.S. Cl.
CPC ...... *G06F 16/1824* (2019.01); *G06F 16/1834* (2019.01); *H04L 9/0643* (2013.01); *H04L 2209/38* (2013.01)

(58) Field of Classification Search
CPC ............ G06F 16/1824; G06F 16/1834; H04L 9/0643; H04L 2209/38
See application file for complete search history.

(56) References Cited

U.S. PATENT DOCUMENTS

| | | | |
|---|---|---|---|
| 2017/0352219 A1* | 12/2017 | Spanos | G07C 13/00 |
| 2018/0114218 A1* | 4/2018 | Konik | H04L 9/3236 |
| 2019/0171849 A1* | 6/2019 | Assenmacher | G06F 21/64 |
| 2019/0188710 A1* | 6/2019 | Mittal | G06Q 20/02 |
| 2019/0238525 A1* | 8/2019 | Padmanabhan | G06F 21/6245 |
| 2019/0268138 A1* | 8/2019 | Mankovskii | G06F 21/64 |
| 2019/0295049 A1* | 9/2019 | Karame | H04L 9/30 |

OTHER PUBLICATIONS

Satoshi Nakamoto, Bitcoin: A Peer-to-Peer Electronic Cash System, 2008.
P. Todd, Treechains,[Bitcoin-development] Tree-chains preliminary summary, https://lists.linuxfoundation.org/pipermail/bitcoin-dev/2014-March/004797.html , 2014.

* cited by examiner

*Primary Examiner* — Hung Q Pham
(74) *Attorney, Agent, or Firm* — McClure, Qualey & Rodack, LLP

(57) ABSTRACT

A blockchain scaling method includes the following operations: determining whether a transaction parameter of a block generating process in an original chain of blocks exceeds a first threshold; and forking the original chain into two sub-chains when the transaction parameter exceeds the threshold, wherein each of the two sub-chains comprises same previous block information corresponding to the original chain and a sub-chain identification.

18 Claims, 6 Drawing Sheets

BLOCKCHAIN SCALING METHOD AND BLOCKCHAIN SCALING APPARATUS

CROSS-REFERENCE TO RELATED APPLICATION

This application claims priority to U.S. Provisional Application Ser. No. 62/648,943, filed on Mar. 28, 2018, which is herein incorporated by reference.

BACKGROUND

Technical Field

Present disclosure relates to a computing apparatus and a computing method. More particularly, present disclosure provides a computing apparatus and a computing method for scaling a blockchain.

Description of Related Art

Trustless peer-to-peer transactions have has been a major innovation unlocking capabilities for many industries, including the Internet of Things (IoT). But the great benefits are lost when transaction fees have a high volatility and transaction latencies become a business risk.

SUMMARY

An aspect of present disclosure is to provide a blockchain scaling method. The method comprises following steps: determining whether a transaction parameter of a block generating process in an original chain of blocks exceeds a first threshold; and forking the original chain into two sub-chains when the transaction parameter exceeds the threshold, wherein each of the two sub-chains comprises same previous block information corresponding to the original chain and a sub-chain identification.

Another aspect of present disclosure is to provide a blockchain scaling apparatus. The apparatus at least comprises a memory and a processor. The memory and the processor are electrically coupled with each other. The memory is configured to store computer readable instructions. The processor is configured to retrieve the computer readable instructions to execute a blockchain scaling method that comprises following steps: determining whether a transaction parameter of a block generating process in an original chain of blocks exceeds a first threshold; and forking the original chain to two sub-chains when the transaction parameter exceeds the threshold, wherein each of the two sub-chains comprises same previous block information corresponding to the original chain and a sub-chain identification.

BRIEF DESCRIPTION OF THE DRAWINGS

Present disclosure can be more fully understood by reading the following detailed description of the embodiment, with reference made to the accompanying drawings as follows.

DETAILED DESCRIPTION

Figure 2:
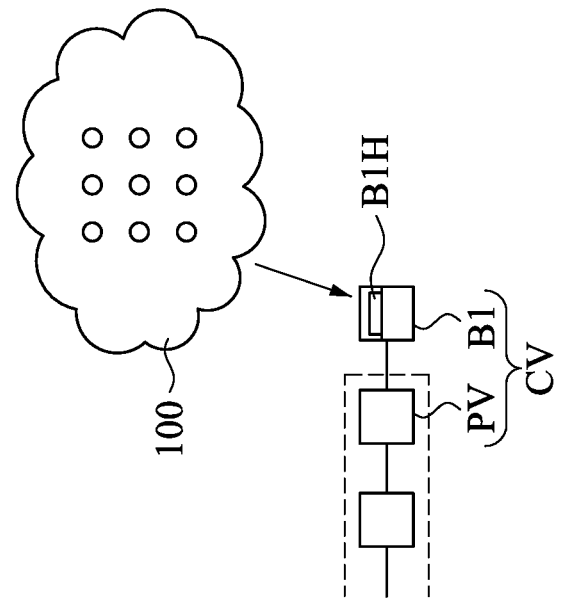
FIG. 2 is a schematic diagram illustrating a blockchain according to some embodiments of present disclosure.

Reference will now be made in detail to the present embodiments of the disclosure, examples of which are illustrated in the accompanying drawings. Wherever possible, the same reference numbers are used in the drawings and the description to refer to the same or like parts.

In the following description and claims, units being described with singulars, such as "one", "the", "that", and "this" are not intended to limit the numbers of the described unit.

In the following description and claims, the terms "first", "second", and the like are not intended to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

In the following description and claims, the term "and/or" may be used to describe one of a plurality things or a combination or said things.

In the following description and claims, some of the directions "up", "down", "before", "after", "prior to", "behind" and the like can be considered as references along with the figures. The scope of present disclosure should not be limited thereto.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Figure 1:
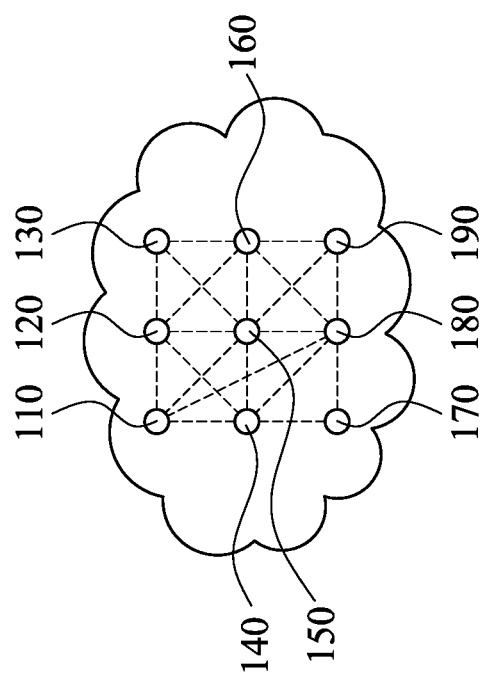
FIG. 1 is a schematic diagram illustrating a network for performing a block generating process according to some embodiments of present disclosure.

Reference is now made to FIG. 1. FIG. 1 is a schematic diagram illustrating a network for performing a block generating process according to some embodiments of present disclosure. In some embodiments, the network 10 includes a plurality of nodes 110-190. Each of the nodes 110-190 is corresponding to a server possessed by an authoritative miner (or a peer) in the network 10. These miners, via the nodes 110-190, are working on a block generating process by fill a new block with transactions in the network 10 and verifying this new block with their hash powers.

In some embodiments, more specifically, the nodes 110-190 may perform the block generating process under a consensus of the following: (1) fill transactions into a block and try to verify the block, if the verification is successful confirm the block; (2) check a block fill rate of the blockchain; (3) in response to the block fill rate reaches (or exceed) a threshold, fork the current chain to form two sub-chains; (4) miners are distributed to grow these two sub-chains; (5) in response to the block fill rate drops to (or under) the threshold, fuse the two sub-chains to form a single chain. These five steps form a blockchain scaling method. Details of this blockchain scaling method will be explained in following paragraphs.

In some embodiments, each block in the blockchain may include a block header (may be presented in a hash form) that records following information: a hash of the previous block (as a reference to the previous blockchain), a chain identification that distinguish the chain from the others, and a nonce (random content that meets a hash target), etc.

In some embodiments, blocks in the blockchain are generated according to transactions at least among the nodes 110-190 in the network 10. When a new transaction is made, it is unverified. Unverified transactions among the nodes 110-190 may be put into pools. Under a proof-of-work (PoW) completion mechanism, to win a new block, each of the nodes 110-190 may collect (or say fill) an amount of transactions from the pools to fill the new block according to its size, and continuously update the nonce until the hash target is met. Once the hash target is met, that node (i.e. one of the nodes 110-190) has the new block be broadcast to the network 10. Other (at least some) nodes may check whether the verification of the new block is correct. When the new block is confirmed by other nodes, the new block may be successfully linked to a previous version blockchain to form a current version blockchain. Then, the nodes 110-190 may keep working based on this current version chain.

However, it is understood that the network structure of FIG. 1 is for exemplary purpose but not intended to limit the scope of present disclosure. Alternative network structures with more miners (i.e. nodes) are possible.

For better understandings, referring to FIG. 2. FIG. 2 is a schematic diagram illustrating a blockchain according to some embodiments of present disclosure. As shown in FIG. 2, it is assumed that, in the block generating process, the node 110 of the network 10 successfully verifies a block B1. The block B1, with a block header B1H signed by the node 110, may be broadcasted to the network 10. Other nodes 120-190 may check whether the verification of the block B1 is correct. If it is determined the block B1 is correct, the block B1 may be linked to a previous version blockchain PV to form a current version blockchain CV. From now on, the nodes 110-190 may accept the current version blockchain CV as an authoritative chain and continue their mining according to this blockchain CV. When each of the nodes 110-190 starts a new block, the hash of the block B1 should be put into a block header of this new block as a reference of this blockchain CV.

In some embodiments, before each time the nodes 110-190 try to fill a block, the nodes 110-190 may monitor a current block fill rate. In particular, this "block fill rate" is a ratio of the current block size and a maximum block size allowed in the blockchain agreed by the network 10 (e.g. among some of the nodes 110-190). Normally, when a network of blockchain begins to develop, there are only a few miners (or say peers) in the network. Afterwards, more miners may join the network and make more transactions. It is natural that the transaction volume in the networks will keep increasing. However, a capacity (or say size) of a single block is limited. Higher transaction volume makes new blocks be filled with more transactions. That is to say, the block fill rate is about the water level of new blocks being mined in the network.

In some embodiments, the block fill rate (or average block fill rate) may be recorded in a block when the block is created, maybe in the block header of the block. In this approach, before the nodes 110-190 try to fill a new block with transactions, the nodes 110-190 may check the previous block for the block fill rate. Then, the nodes 110-190 may determine whether the block fill rate exceeds a predetermined threshold (e.g. 80%). If it is determined that the block fill rate exceeds the predetermined threshold, the nodes 110-190 (i.e. the users in the network 10) may agree on a modification to the blockchain structure. However, it is noted that the value of the predetermined threshold is not intended to limit the scope of present disclosure.

Figure 3:
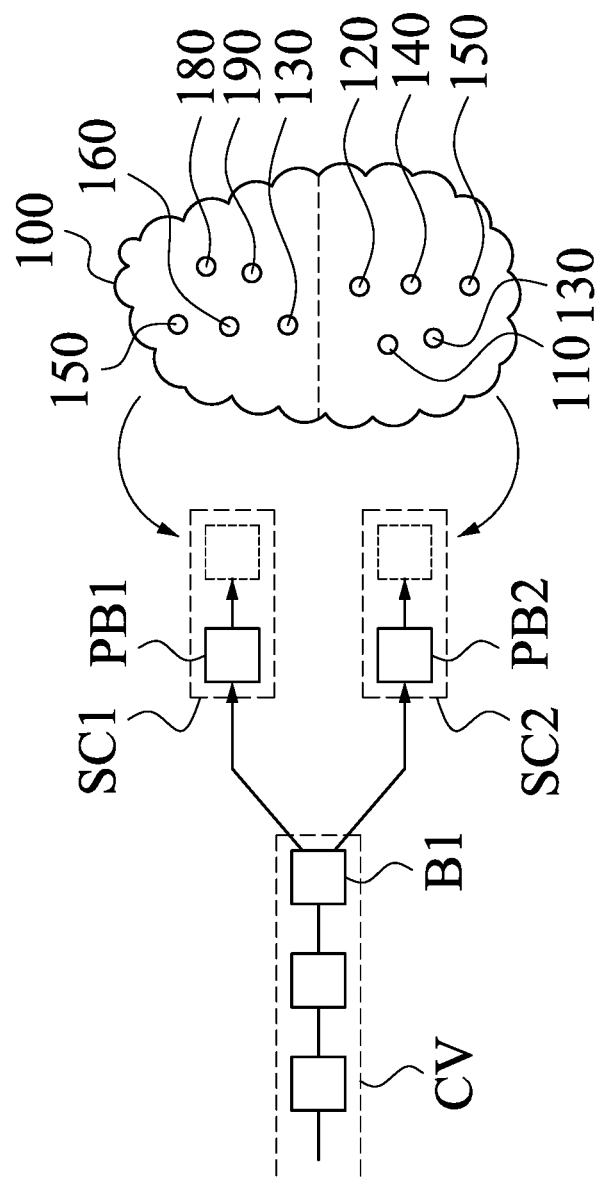
FIG. 3 is a schematic diagram illustrating a blockchain according to some embodiments of present disclosure.

For better understandings, referring to FIG. 3. FIG. 3 is a schematic diagram illustrating a blockchain according to some embodiments of present disclosure. As shown in FIG. 3, it is assumed that, in the block generating process, when the block B1 is linked to the previous version blockchain PV to form the current version blockchain CV, the nodes 110-190 find the block fill rate corresponding to the block B1 reaches (or exceeds) the predetermined threshold. In this case, the nodes 110-190 agree on that the current version blockchain CV stops here. And, the nodes 110-190 agree on that a pair of parallel blocks to be generated from this point. It means that, starting from the block B1, the blockchain CV may grow into two separate branches. As shown in FIG. 3, according to such consensus, two potential new blocks PB1 and PB2 may be referenced to the same previous block B1. In this way, once the potential new blocks PB1 and PB2 are successfully won by some of the nodes 110-190, the blockchain CV may be split into the sub-chains SC1-SC2.

In some embodiments, since the authoritative blockchain has been forked into the sub-chains SC1-SC2, in view of efficiency, the miners (i.e. the nodes 110-190) may be separated into two groups correspondingly for the following block generating process. The concept is, when the average block fill rate goes high, a mother chain (i.e. the blockchain CV) may be forked into two child-chains (i.e. the sub-chains SC1-SC2) so that the entire network may be partitioned to handle the block generating process better. In some embodiments, the confirmation of the new blocks in a sub-chain may only be executed by the nodes handling this sub-chain.

For example, in some embodiments, as shown in FIG. 3, each of the sub-chains SC1-SC2 is given a binary hash tag. The sub-chain SC1 has a hash mark of a single binary digit #0 and the sub-chain SC2 has a hash mark of a single binary digit #1. The block header of each block in the forked sub-chain (i.e. SC1 and SC2) may be stored with the hash mark of the sub-chain that the block belongs to. In some embodiments, the consensus is, the nodes 110-190 may match the binary digit of that sub-chain. As a result, some of the nodes 110-190 may be logically distributed to the block generating process of the sub-chain SC1 and other nodes may be logically distributed to the block generating process of the sub-chain SC2. Additionally, when new miners (i.e. nodes) join the network, they may be distributed on the sub-chains SC1-SC2 according to their identity address as well. It is noted that, in some embodiments, creations of blocks in a sub-chain is limited to transactions issued by the network participants (i.e. users of the network) having identity addresses matching the sub-chain identification (i.e. the binary hash tag) of that sub-chain. Because the sub-chains in present disclosure (i.e. SC1 and SC2) may be interlinked, it is most economical for miners having large amount of hash power to distribute their hash power across many sub-chains while smaller miners (the one with less hash powers) may just focus on mining a single sub-chain.

In this embodiment, it is assumed that the nodes 110-140 are distributed to create blocks of the sub-chain SC2 and the nodes 150-190 are distributed to create blocks of the sub-chain SC1, as shown in the figure. The nodes in the network 10 are considered being divided into two working groups. Each group may work on one or many sub-chain (i.e. child-chain). However, it is noted that the above distribution is not intended to limit the scope of present disclosure. Alternative hash power distribution ways are possible.

It is noted that, in some embodiments, when the mother chain splits into two child-chains, the block fill rates of each child-chains may be calculated separately. It is, because the transactions of the entire network 10 are partitioned between the sub-chains and each be handled by a group of miners, the block fill rates of these two groups may be individual. In some embodiments, the block fill rate may be calculated as a moving average (MA). When the block fill rate of a single sub-chain reaches the threshold, another sub-fork may be extended.

Figure 4:
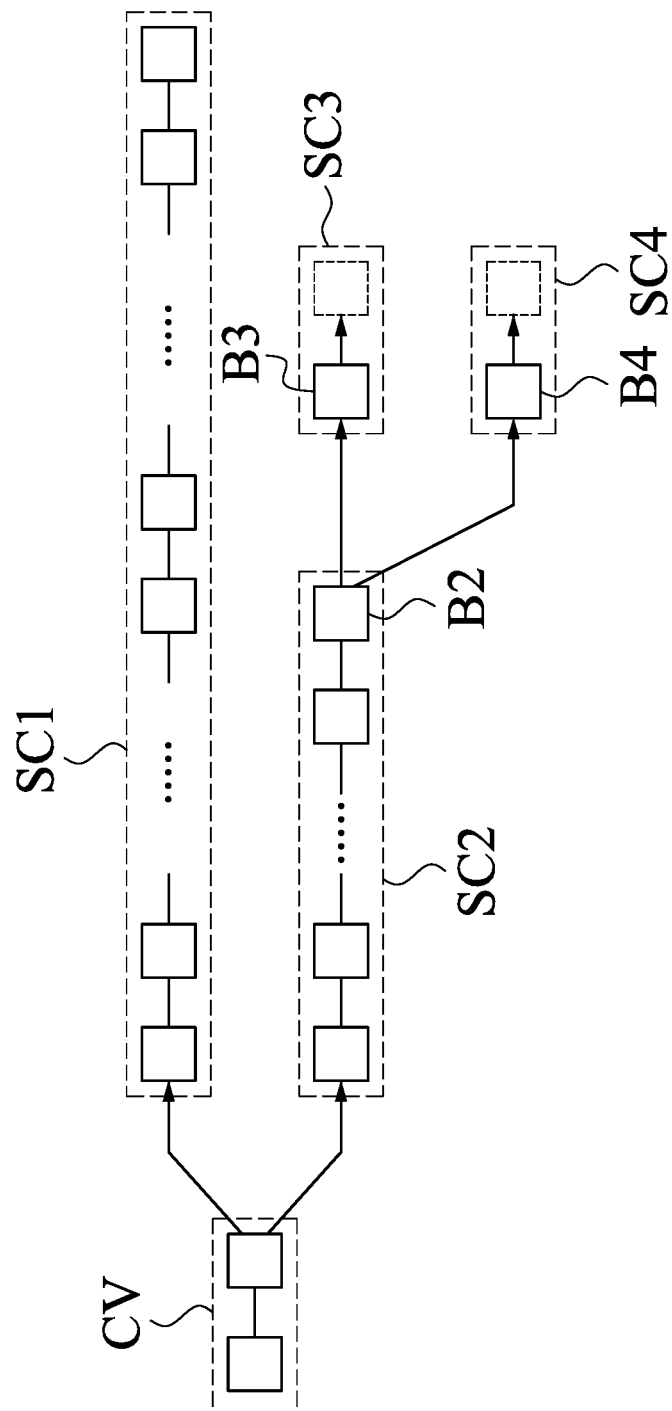
FIG. 4 is a schematic diagram illustrating a blockchain according to some embodiments of present disclosure.

For better understandings, referring to FIG. 4. FIG. 4 is a schematic diagram illustrating a blockchain according to some embodiments of present disclosure. As shown in FIG. 4, it is assumed that, in the block generating process of the sub-chain SC2, when a block B2 is created, the nodes 110-190 find the block fill rate reaches (or exceeds) the predetermined threshold. From this point, the nodes (i.e. nodes 110-140) being distributed to the sub-chain SC2 know that it is time for the sub-chains SC2 to be forked into two. As shown in FIG. 4, in the following block generating process, two potential new blocks B3-B4 may be referenced to the block B2. The blocks B3 may grow into a sub-subchain SC3 of the sub-chain SC2. The blocks B4 may grow into a sub-subchain SC4 of the sub-chain SC2. That is, two sub-subchains of the sub-chain SC2 may be formed when the block fill rate hits the predetermined threshold again.

However, it is understood that the above embodiment is not intended to limit the scope of present disclosure. In an alternative embodiment, when the nodes 110-190 agree the block fill rate of sub-subchains SC3-SC4 reaches the predetermined threshold, the blockchain would not be forked immediately (i.e. at the next block). In such embodiment, the sub-chains (or sub-subchains) are allowed to be away from each other in an allowable block height. In other words, the block height difference among the sub-chains (or sub-subchains) is in controlled. The height difference may be calculated as follows: it is assumed that, in some embodiments, the sub-subchain SC3 is in a height of 95 blocks and the sub-subchain SC4 is in a height of 98 blocks. The height difference between the sub-subchains SC3-SC4 is 3. In such embodiment, when it is found that the block fill rate fails to exceed the predetermined threshold when a block of the sub-subchains SC3-SC4 is created, the nodes 110-190 may agree to fuse the sub-subchains SC3-SC4 after another N blocks being generated. The number N may be the allowable block height difference agreed in the network 10.

In some embodiments, the forking of the sub-chain SC2 may trigger a hash power redistribution of the miners (i.e. nodes 110-140). As shown in FIG. 4, the sub-subchain SC3 is given a binary hash tag of two binary digits #1, 0 and the sub-subchain SC4 is given a binary hash tag of two binary digits #1, 1. The binary hash tags of these sub-subchains SC3-SC4 are extended from the hash mark of the sub-chain SC2, with one more binary digit. In this manner, the hash powers of the sub-chain SC2 may be redistributed into the sub-subchains SC3-SC4.

It is understood that, in a similar manner, the sub-chains SC1 may split into another two sub-subchains when the block fill rate of the sub-chains SC1 reaches the predetermined threshold. However, the predetermined thresholds among these sub-chains may be different.

Figure 5:
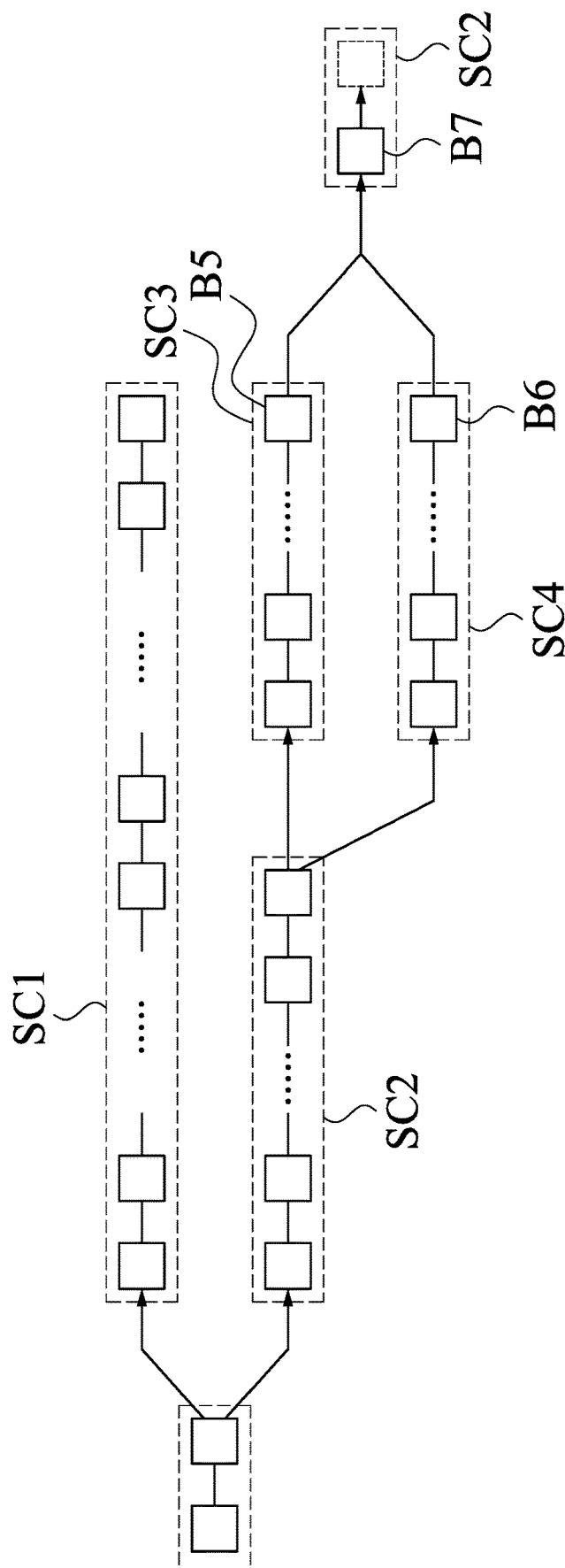
FIG. 5 is a schematic diagram illustrating a blockchain according to some embodiments of present disclosure.

In some embodiments, in view of efficiency, when a sum of the block fill rate of the sub-chains extending from one mother chain (e.g. sub-subchains SC3-SC4 under the sub-chain SC2) drops to a lower threshold, there is a mechanism for the sub-chains to be fused into one (i.e. back to the mother chain). However, it is noted that the fusion may be limited to two child-chains of the same mother-chain. To allow for better understandings, reference is made to FIG. 5. FIG. 5 is a schematic diagram illustrating a blockchain according to some embodiments of present disclosure. As shown in FIG. 5, in some embodiments, the sub-chain SC2 has the sub-subchains SC3-SC4. The newest block of the sub-subchain SC3 is a block B5. The newest block of the sub-subchain SC4 is a block B6. In some embodiments, at this point, the miners in the network 10 agree on that a sum of the block fill rates of the sub-subchain SC3 and the sub-subchain SC4 drops under a predetermined threshold (this is lower than the threshold of forking, maybe 20%, for example). In other words, the miners in network 10 find that the sum of the block fill rates of the child-chains extending from the sub-chain SC2 decreases to a certain level. In this case, the block generating process may be redirected to chain fusion. To do this, the miners in the network 10 may fill transactions into a potential new block B7 with hashes of both the block B5 and block B6. When the potential new block B7 is successfully verified, the miners in the network 10 may take the block B7 as the newest authoritative block since it is referenced to both the blocks B5-B6. Starting from the block B7, the sub-subchain SC3-SC4 is fused back into the sub-chain SC2. Still, the sub-chain SC2 is parallel to the sub-chain SC1.

In some embodiments, to avoid the cross-chain fusion, the fusion may be limited to the sub-chains according to their binary hash tags. For example, as shown in FIG. 5, the binary hash tag of the sub-subchain SC3 is #1,0 and the binary hash tag of the sub-subchain SC4 is #1,1. Since the sub-subchains SC3-SC4 are identical in the first digits of the binary hash tags. The sub-subchains SC3-SC4 can be fused to form the sub-chain SC2. In contrast, the first digit of the binary hash tag of the sub-subchains SC3 is different from the one of the sub-chain SC1. That means a fusion between the sub-subchain SC3 and a sub-subchain extending from the sub-chain SC1 is not allowable since they do not have the same immediate mother chain. It is to say, the binary hash tags may be used to avoid such disallowed fusion between mother and child chains.

In some embodiments, when the sub-subchains SC3-SC4 are fused into the sub-chain SC2. The sub-chain SC2 is given with the same binary hash tag of #1. The binary hash tag of the fused sub-chain SC2 is identical to the binary hash tag of the sub-chain SC2 mentioned in the embodiment of FIG. 3.

The concept of the foregoing embodiments is to handle the growth of hash powers and the growth of transaction volumes independently. On one hand, when hash powers grow, a difficulty level of each sub-chains is adjusted accordingly to keep all the sub-chains at equal fixed pace. On the other hand, when the transaction volume grows (or shrinks), the sub-chains can be forked or fused (according to the high threshold or the low threshold) to allow the network to deal with any amount of transactions. This approach explains how the blockchain be dynamically re-scaled according to the block fill rates. It is understood that the forking and fusing shown in the embodiments of FIGS. 2-5 are for exemplary purpose but not intended to limit the scope of present disclosure.

In some embodiments, the nodes (e.g. nodes 110-190) in the networks may have consensus to adjust hash difficulties of the forked chains under certain circumstances. Usually, when the generation of a new block gets faster, the degree of difficulty of that fork becomes higher. In some embodiments, the nodes may monitor the gap between two successive blocks to determine whether to raise hash difficulty of the fork. The hash difficulties may be raised by giving the fork a harder hash target (e.g. a hash target with more zeros). However, it is noted that the examples of the hash difficulties are not intended to limit the scope of present disclosure.

It is understood that, although the entire network is logically divided into small groups to handle transactions in the sub-chains, cross-fork transactions are still available in some embodiments. To do this, a miner has to check an identity address matching this transaction and write an additional block external reference into a new block. The external reference may be pointed to the source of the transaction where it is spent in other forks. That reference creates a cross-fork confirmation to the miners in the network.

Figure 6:
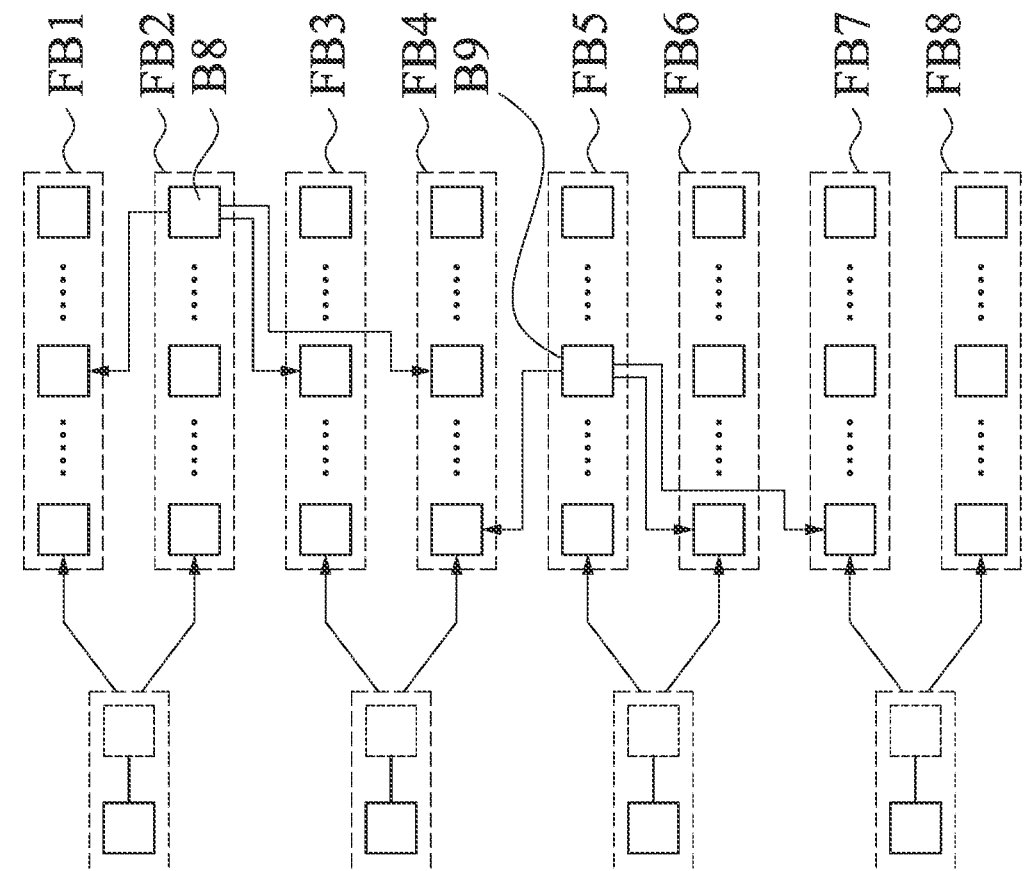
FIG. 6 is a schematic diagram illustrating a blockchain according to some embodiments of present disclosure.

In some embodiments, such cross-fork references may also be used to establish a secured mechanism of the blockchain. For better understandings, reference may be made to FIG. 6. FIG. 6 is a schematic diagram illustrating a blockchain according to some embodiments of present disclosure. FIG. 6 shows a blockchain BC generated according to the approach showing in the embodiments of FIGS. 2-5. In the embodiment, the blockchain BC is the mother-chain having nine child-chains FB1-FB8. As shown in the figure, some of the blocks in these forks FB1-FB8, for example the blocks B8 and B9, have cross-fork references with blocks in other forks. These cross-fork references may be built by establishing aforementioned cross-fork transactions.

It is noted that, in above embodiments, when the hash powers of the entire networks are evenly distributed into the branches of the blockchain, a single branch would be much vulnerable to hash power attacks (i.e. 51% attack). Apparently, to compete with fewer miners on one fork is much easier than compete with the entire network. The cross-fork reference mechanism may ensure forks are tightly connected with each other. It makes the idea of attacking single fork more difficult. Theoretically, a number of cross-fork references of a block may be determined by logarithm of the total number of the child-chains. For example, in the embodiment of FIG. 6, when there are 8 forks in the blockchain BC, one block may be connected to log2(8) numbers of blocks in other child-chains to ensure the mechanism. In some embodiments, a block and a referenced block thereof may not away from a predetermined distance (e.g. a distance of 12 blocks). This may keep the forks of the blockchain nearly the same height when the blockchain is expanding.

It is noted that, in the foregoing embodiments, the block generating process may be performed by any of the nodes 110-190 in the network 10. More specifically, the block generating process runs on an apparatus corresponding to each of the nodes 110-190. These apparatus may be configured with necessary memories and processors.

Figure 7:
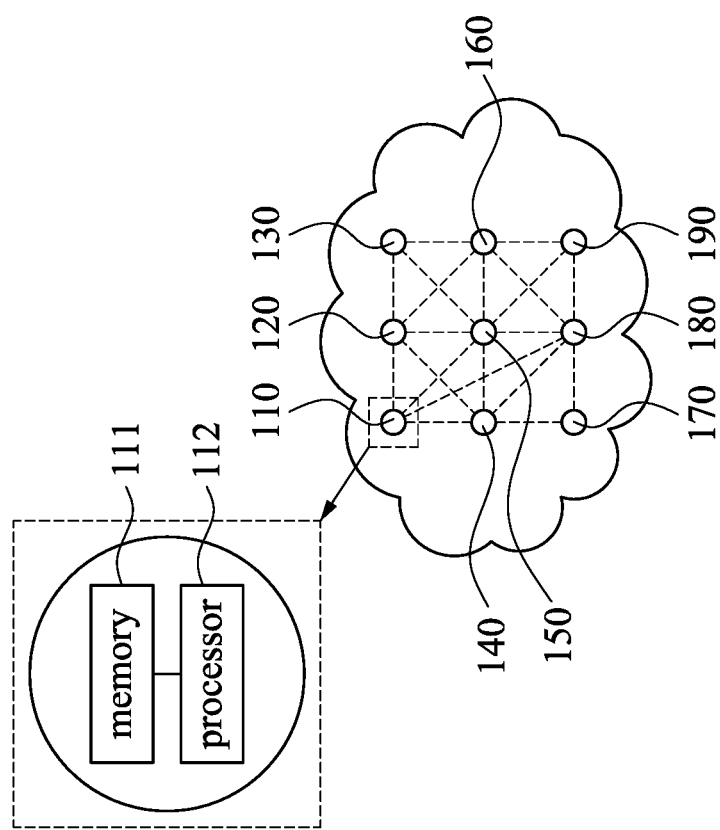
FIG. 7 is a schematic diagram illustrating a blockchain scaling apparatus according to some embodiments of present disclosure.

For better understandings, referring to FIG. 7. FIG. 7 is a schematic diagram illustrating a blockchain scaling apparatus according to some embodiments of present disclosure. As shown in FIG. 7, in some embodiments, the apparatus corresponding to the node 110 may include a memory 111 and a processor 112 electrically coupled with each other. It is noted that, in some embodiments, the configurations of other nodes 120-190 in the network 10 may be the same, but not limited thereto.

In some embodiments, the memory 111 may be a transitory/non-transitory internal memory that stores some computer readable instructions that defines the blockchain scaling method as described above.

In some embodiments, the processor 112 may be formed by, but not limited to, a single processing circuit (e.g. CPU, GPU) or integrated microprocessors (e.g. Application Specific Integrated Circuits). The processor 112 may access the computer readable instructions to execute the blockchain scaling method. In other words, the memory 111 is considered a non-transitory computer readable medium for the processor 112 to reach the consensus with other nodes in the network 10. However, it is understood that the configuration of the node 110 are for exemplary purpose but not to limit the scope of present disclosure.

In view of foregoing embodiments, present disclosure provides an efficient approach to re-scale the expanding blockchain based on the numbers of miners and the amount of transactions in the network. As transaction frequency grows, split the blockchain into branches to distribute the miners. When transaction frequency shrinks, merge the branches into the blockchain to rejoin the miners. This mechanism allows the network system to adapt the blockchain environment dynamically.

Although the present disclosure has been described in considerable detail with reference to certain embodiments thereof, other embodiments are possible. Therefore, the spirit and scope of the appended claims should not be limited to the description of the embodiments contained herein. It is noted that the approach of present disclosure may still work to a blockchain mechanism under Proof-of-Stake (PoS) or other consensus mechanisms.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A blockchain scaling method, comprising:
  determining, by a processor, whether a transaction parameter of a block generating process in an original chain exceeds a threshold, wherein the transaction parameter is a block fill rate being a ratio of a current block size of the original chain and a maximum block size of the original chain;

stopping, by the processor, the original chain when the transaction parameter exceeds the threshold; and generating, by the processor, a pair of sub-chains when the original chain is stopped, wherein each of the two sub-chains comprises same previous block information corresponding to the original chain and a sub-chain identification.

2. The method of claim 1, comprising:

determining whether the transaction parameter of the block generating process in the two sub-chains exceeds he threshold; and stopping the pair of sub-chains to continue the original chain when he transaction parameter fails to exceed the threshold.

3. The method of claim 2, wherein stopping the pair of the two sub-chains to continue the original chain further comprising:

in response to the transaction parameter failing to exceed the threshold, stopping the pair of sub-chains to continue the original chain alter a first number of blocks being generated in the block generating process, wherein the first number is an allowable block height difference between the two sub-chains.

4. The method of claim 1, wherein the transaction parameter is a moving average of the block fill rate of the block generating process.

5. The method of claim 1, wherein the sub-chain identification is a binary digit indicating one of the two sub-chains.

6. The method of claim 5, further comprising:

creating a block in one of the sub-chains, wherein the block comprises a plurality of transactions issued by network nodes having identity addresses matching the sub-chain identification of one of the sub-chains.

7. The method of claim 6, wherein when any of the plurality of transactions is a cross-chain referenced transaction, the block corresponding to such transaction comprises reference information of the blocks in the other sub-chains.

8. The method of claim 7, wherein a number of the sub-chains being referenced is N, the reference information comprises information of at least log N of the blocks.

9. The method of claim 1, wherein a block in one of the sub-chains and a reference block thereof in another sub-chain are not away from a predetermined distance.

10. A blockchain scaling apparatus, comprising:

memory configured to store computer readable instructions; and a processor electrically coupled to the memory and configured to retrieve the computer readable instructions to execute a blockchain scaling method that comprises:

determining whether a transaction parameter of a block generating process in an original chain exceeds a threshold, wherein the transaction parameter is a block fill rate being a ratio of a current block size of the original chain and a maximum block size of the original chain;

stopping the original chain when the transaction parameter exceeds the threshold; and generating a pair of sub-chains when the original chain is stopped, wherein each of the two sub-chains comprises same previous block information corresponding to the original chain and a sub-chain identification.

11. The apparatus of claim 10, the blockchain scaling method executed by the processor further comprises:

determining whether the transaction parameter of the block generating process in the two sub-chains exceeds he threshold; and stopping the pair of the two sub-chains to continue the original chain when the transaction parameter fails to exceed the threshold.

12. The apparatus of claim 11, wherein stopping the pair of the two sub-chains to continue the original chain further comprising:

in response to the transaction parameter failing to exceed the threshold, stopping the pair of the two sub-chains to continue the original chain alter a first number of blocks being generated in the block generating process, wherein the first number is an allowable block height difference between the two sub-chains.

13. The apparatus of claim 10, wherein the transaction parameter is a moving average of the block fill rate of the block generating process.

14. The apparatus of claim 10, wherein the sub-chain identification is a binary digit.

15. The apparatus of claim 14, wherein the blockchain scaling method further comprises:

creating a block in one of the sub-chains wherein the block comprises a plurality of transactions issued by network nodes having identity addresses matching the sub-chain identification of one of the sub-chains.

16. The apparatus of claim 15, wherein when any of the plurality of transactions is a cross-chain referenced transaction, the block corresponding to such transaction comprises reference information of the blocks in the other sub-chains.

17. The apparatus of claim 16, wherein a number of the sub-chains being referenced is N, the reference information comprises information of at least log N of the blocks.

18. The apparatus of claim 14, wherein a block in one of the sub-chains and a reference block thereof in another sub-chain are not away from a predetermined distance.

* * * * *